United States Patent
Baker et al.

(10) Patent No.: US 11,041,742 B2
(45) Date of Patent: Jun. 22, 2021

(54) SECURE THERMALLY-MANAGED CASE FOR A SENSING DEVICE

(71) Applicant: Lyft, Inc., San Francisco, CA (US)

(72) Inventors: Matthew Douglas Baker, San Diego, CA (US); Srinivasa Rao Damaraju, Fremont, CA (US); Alfred Charles Jones, II, San Jose, CA (US); Marco Antonio Marroquin, San Mateo, CA (US); Kevin Page, Mountain View, CA (US)

(73) Assignee: Lyft, Inc., San Francisco, CA (US)

( * ) Notice: Subject to any disclaimer, the term of this patent is extended or adjusted under 35 U.S.C. 154(b) by 0 days.

(21) Appl. No.: 16/586,904

(22) Filed: Sep. 27, 2019

(65) Prior Publication Data

US 2021/0096004 A1    Apr. 1, 2021

(51) Int. Cl.
*G01D 11/24*    (2006.01)

(52) U.S. Cl.
CPC .................................. *G01D 11/245* (2013.01)

(58) Field of Classification Search
CPC .............................. G01D 11/245; G01D 11/24
See application file for complete search history.

(56) References Cited

U.S. PATENT DOCUMENTS

| | | | | |
|---|---|---|---|---|
| 8,051,904 | B1* | 11/2011 | Whiting | B60H 1/00264 165/202 |
| 10,432,013 | B2* | 10/2019 | Langlois | H02J 7/35 |
| 10,729,038 | B1* | 7/2020 | Colwell | H04M 1/24 |
| 2011/0072834 | A1* | 3/2011 | Ishikura | G05D 23/192 62/3.2 |
| 2014/0291521 | A1* | 10/2014 | Rossinger | G01J 5/0205 250/338.4 |
| 2016/0173667 | A1* | 6/2016 | Torres Gutierrez | H04M 1/04 455/575.1 |
| 2016/0183108 | A1* | 6/2016 | Mehrgardt | H04B 1/3822 455/456.1 |
| 2016/0308569 | A1* | 10/2016 | Wei | H02J 7/00 |
| 2017/0334363 | A1* | 11/2017 | Bekaert | B60R 11/0241 |
| 2018/0208015 | A1* | 7/2018 | Zhang | H02S 10/40 |
| 2018/0241917 | A1* | 8/2018 | Zhang | H05K 1/0203 |
| 2019/0003757 | A1* | 1/2019 | Miros | F25D 11/003 |
| 2019/0031113 | A1* | 1/2019 | Munoz | B60R 11/0241 |
| 2019/0106057 | A1* | 4/2019 | Jaime Tamayo | B60R 1/04 |
| 2019/0128497 | A1* | 5/2019 | Tessnow | B60Q 1/0023 |
| 2020/0033480 | A1* | 1/2020 | Augspurger | G01S 17/931 |
| 2020/0267253 | A1* | 8/2020 | Grunfeld | H04M 1/72577 |
| 2020/0310552 | A1* | 10/2020 | Betancur Ramirez | G06K 9/00355 |

FOREIGN PATENT DOCUMENTS

JP    2008053641    *    3/2008

* cited by examiner

*Primary Examiner* — Jamel E Williams
(74) *Attorney, Agent, or Firm* — Baker Botts L.L.P.

(57) ABSTRACT

In one embodiment, the apparatus includes a temperature-controlled enclosure for a sensing device comprising insulating air gaps, a fan, and a heatsink. The enclosure maintains the sensing device within a desired operating temperature range while operating in automotive environments with high ambient temperatures and solar radiation. The enclosure is configured to be securely affixed to an automobile interior and has a configuration of temperature-control systems which allows for unimpeded functioning of the sensing device's communications hardware.

20 Claims, 10 Drawing Sheets

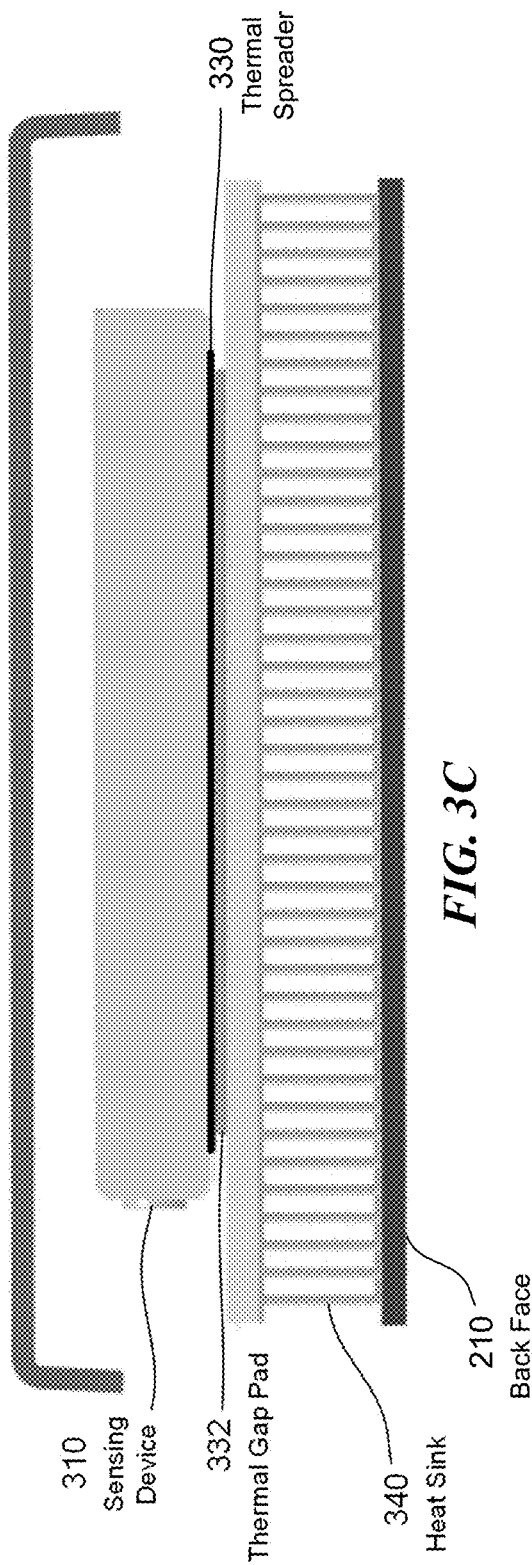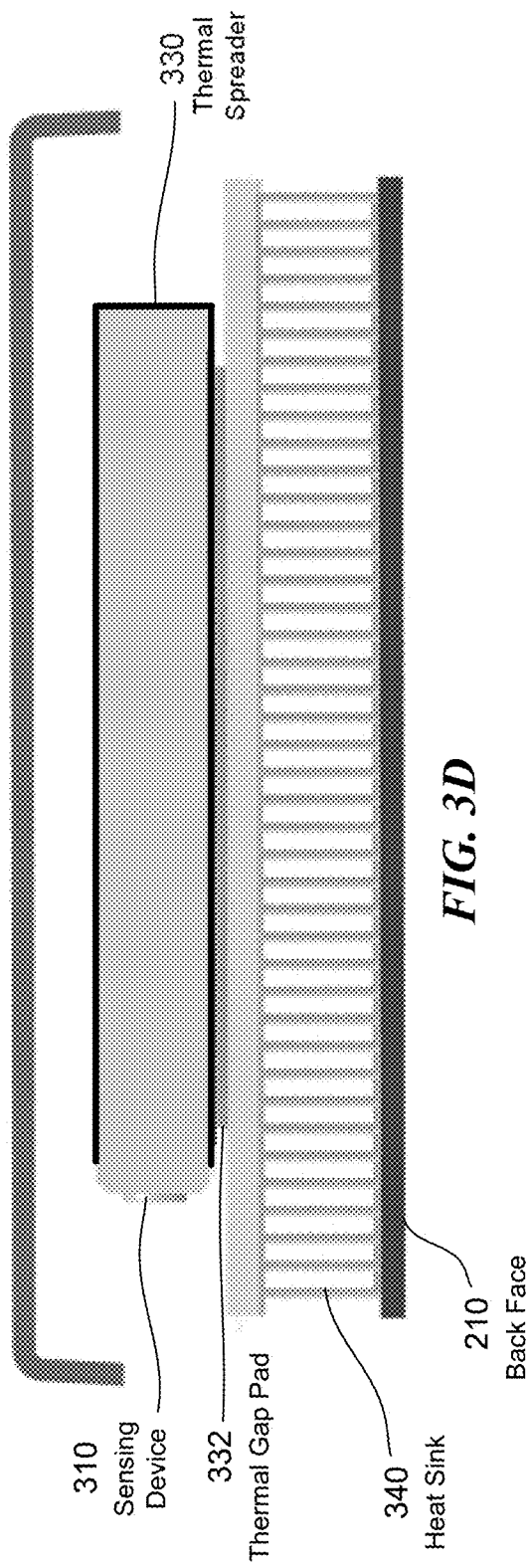

US 11,041,742 B2

SECURE THERMALLY-MANAGED CASE FOR A SENSING DEVICE

BACKGROUND

Sensing and imaging devices are finding increasing application in automotive contexts. Sensing and imaging devices can include mobile computing devices, smartphones, tablets, watches, cameras, LiDAR sensors, radars, or other data acquisition devices. Some of these can be handheld, wearable, or affixed to the interior or exterior of a mobile platform. In many cases, these devices are required to maintain a stable operating temperature, resist damage from dropping or collisions, and prevent theft or use by unauthorized parties. Within an automotive context, device failure due to overheating, damage due to collisions, and loss due to theft are imminent challenges.

BRIEF DESCRIPTION OF THE DRAWINGS

FIGS. 3A-3D illustrate a cross section of a case for a sensing device with impinging solar radiation, in accordance with particular embodiments.

DESCRIPTION OF EXAMPLE EMBODIMENTS

Figure 1:
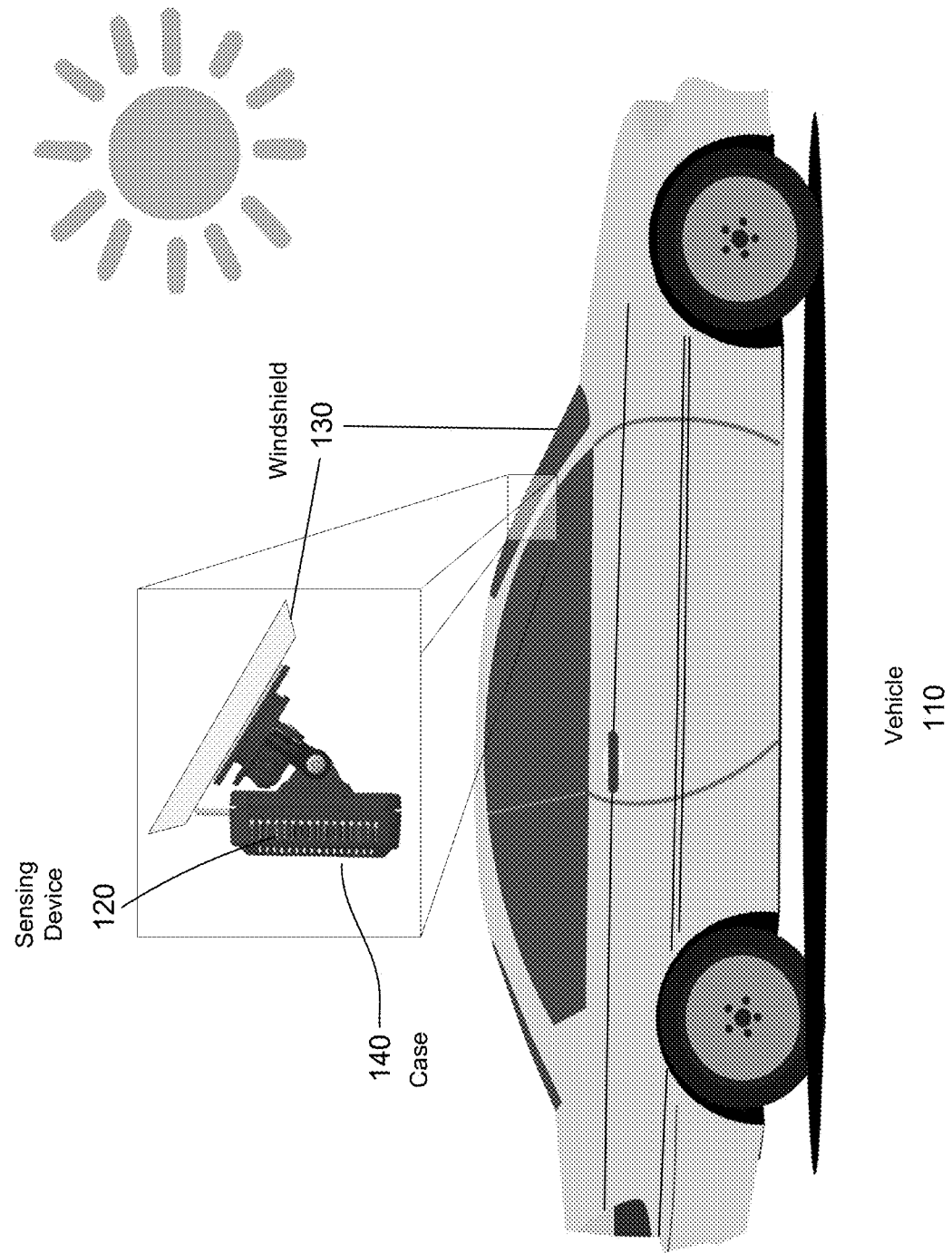
FIG. 1 illustrates an example automotive environment for a sensing device.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. In addition, the embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Sensing and imaging devices can include mobile computing devices, smartphones, tablets, watches, cameras, LiDAR sensors, wearable computers, or other data acquisition devices. Within an automotive context, such devices provide a means of enabling ridesharing, geospatial mapping, simultaneous localization and mapping (SLAM), and other autonomous or semi-autonomous vehicle technologies. Within an automotive environment, temperature control, theft and tampering prevention, communication reliability, and power consumption become important objectives for such devices. A secure, thermally-managed case for sensing devices, that also allows maximal device usability in automotive environments, is therefore an important and useful solution for satisfying these objectives.

For applications such as visual SLAM, geospatial mapping, or ridesharing, a sensing device may be affixed to a window or the windshield of a vehicle. This allows a sensing device to: a) have a clear line-of-sight to the exterior environment of the vehicle (e.g., for video data acquisition via a camera associated with the sensing device), b) have a clear line-of-sight to the atmosphere for radio-frequency (RF) communication, and/or c) present a display to a human user in the interior of the vehicle (e.g., a driver viewing a map or video on the sensing device). While satisfying one or more of these conditions, the placement of a sensing device on the windshield of a vehicle also subjects it to solar radiation, resulting in radiative heating of the device.

The thermal characteristics of automotive environments present challenges for the reliable operation of sensing devices. Sensing devices have operating temperature ranges determined by the integrated circuits (ICs) of which they are comprised. Elevated temperatures eventually result in logical faults or errors in computation within the ICs of the sensing device. If the temperature of a sensing device increases or exceeds the limits of its operating temperature range, the amount of computation the device can reliably perform will consequently decrease.

As an example, a sensing device may process video frame data at a frame rate of 60 frames per second (fps) for a geospatial mapping task at a device temperature of 30° C. The resistive heat dissipation of the device as it processes the data may raise the temperature of the device. The temperature of the device may be further raised by the automobile interior temperature or by solar irradiation. Say the device has an operating temperature limit of 65° C., and the device quickly approaches this limit. To prevent the device from exceeding this limit, the video processing may be slowed from 60 fps to 15 fps to reduce the heat produced by the device and ensure reliability as it processes the video data. As a result, the frame rate of the video data will be decreased, resulting in less data being collected, and reducing the efficiency of the associated mapping task.

Automotive environments also present challenges for the security of sensing devices. A sensing device affixed to a window may be tampered with or otherwise removed from the automobile by an unauthorized user. An example would be a smartphone affixed to a windshield for continuous collection of video data. If the vehicle is to be operated by different parties over time, it may be necessary to prevent any one party from tampering with the device (e.g., turning off its camera, changing the angle of capture or field of view of the camera, stealing the device, etc.). A further example would be the case of rental vehicles or ridesharing, in which the host vehicle may have a number of different passengers and/or drivers over time, any one of which could try to tamper with or steal the device.

It is also notable that the challenge of device security often conflicts with the thermal management requirements of the device. For example, enclosing or securing a sensing device within a case often means inhibiting the ability of the device to dissipate heat through radiation or convection. An as illustrative example, placing a sensing device in a case or container with no active cooling would cause the heat from the sensing device to collect in the trapped air around the device, thus raising the possibility or overheating or device failure. In this case, in the absence of active thermal management by the case, security and thermal management can be incompatible objectives.

Another challenge is that sensing devices are also sometimes limited in terms of internal energy storage, which affects the maximum operating time between charging the device's internal battery. For continuous collection of video data or intensive RF communication, the battery of a sensing device may be quickly depleted. Within an automobile, sensing devices can recharge their internal batteries using the vehicle's auxiliary power supply or through a solar photovoltaic array. Providing a means of connecting the sensing device to such power supplies represents an additional consideration.

Placing a sensing device in an enclosing structure for security, temperature control, or power management in an automotive environment also requires consideration of the RF communication functionality of the sensing device. Radio waves are generally reflected by structures composed of conductive media, such as metals. Consequently, the use of metallic components in an enclosing structure for a sensing device may degrade the RF communication functionality of the sensing device. Reducing the use of, or carefully placing, such metal components is a critical design consideration for any secure, temperature-controlled enclosure of a sensing device.

FIG. 1 illustrates an example scenario for use of a secure, temperature-controlled enclosure for sensing devices in an automotive environment. An automobile 110 may operate in a variety of temperature extremes, including hot or sunny days, with high ambient temperatures or large amounts of solar radiation. A sensing device 120 may be affixed to the automobile windshield 130 via the use of the secure, temperature-controlled enclosure or case 140. The sensing device is enclosed in the case, and may be performing various computational and communications tasks associated with a dynamic matching network, SLAM, geospatial mapping or scenario collection, or other varieties of tasks. The case may be attached to the windshield or any other interior surface of the vehicle. The case may be attached to such surfaces via a suction cup, bolts, glue, or the like, integrated into the vehicle body, and/or through any other mechanical means of attachment.

Figure 2B:
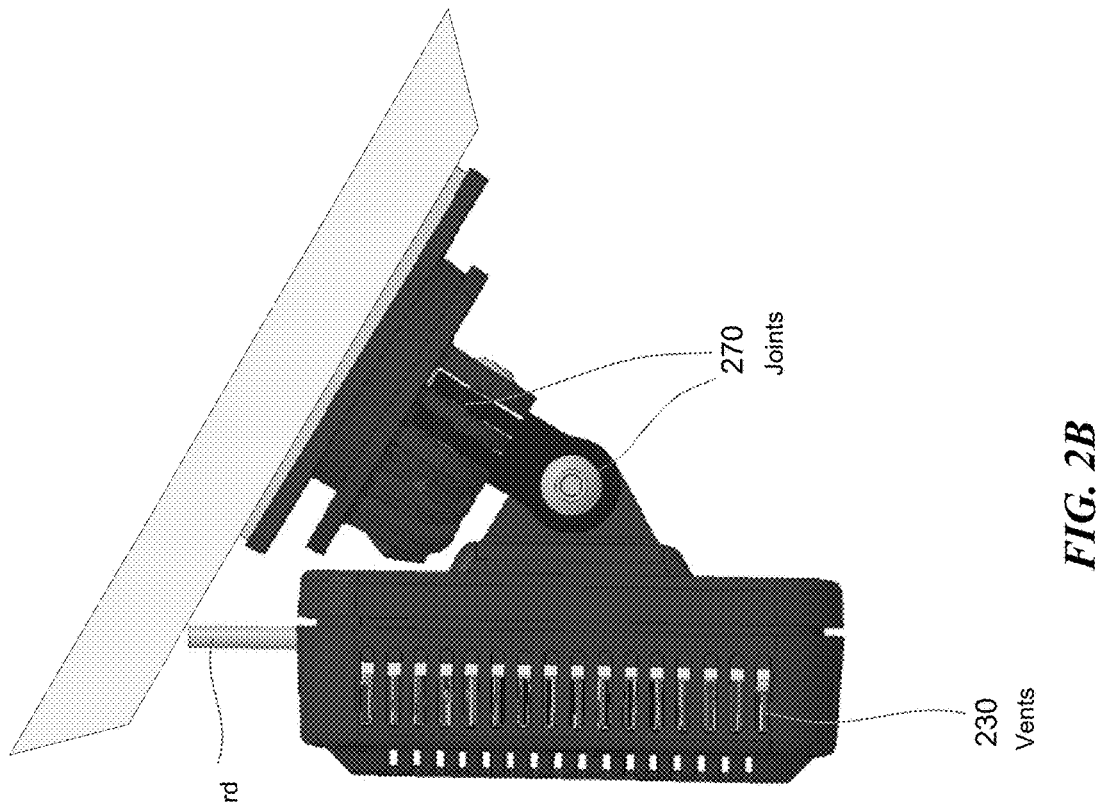
FIGS. 2A-2B illustrate a case for a sensing device, in accordance with particular embodiments.
Figure 2A:
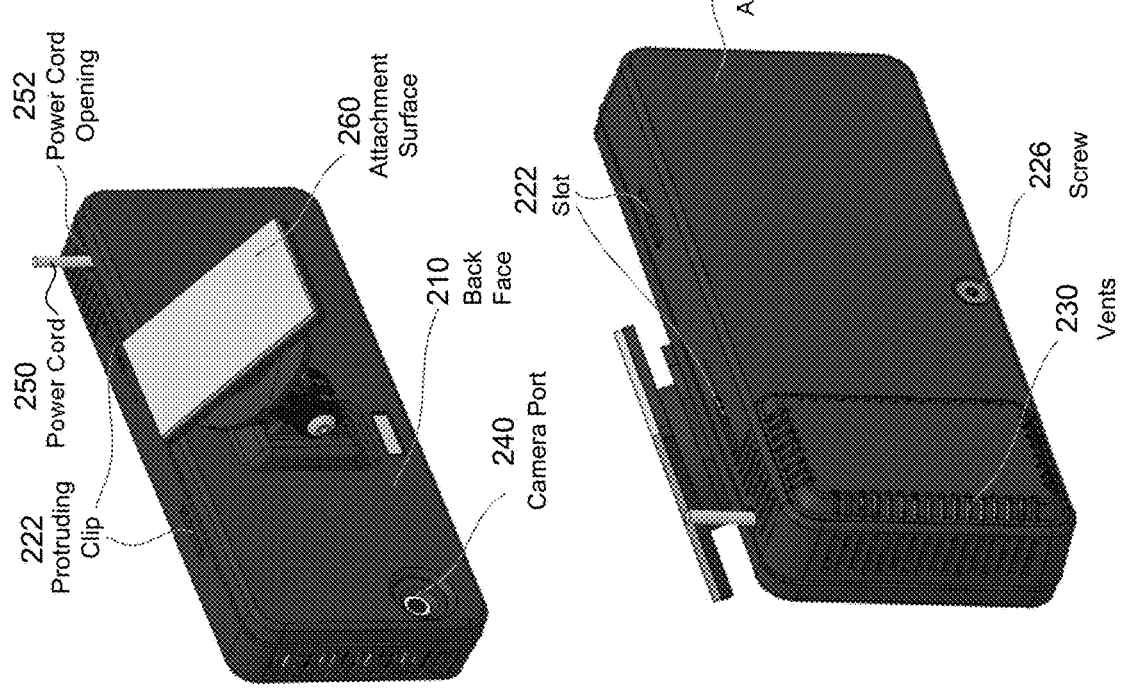

FIG. 2A illustrates several features of particular embodiments of a secure, temperature-controlled case. In one embodiment, the case body encloses the sensing device and is comprised of a back face 210 and an attachable front face 220. Although the front of the case is referenced herein as being the side that is pointed toward the internal cabin of the vehicle, the reference to the front may be reversed, so that the front of the case refers to the side facing outside the vehicle, without changing or limiting the functionality of the device herein. As such, the coordinate plane and references to front and back should not be construed as limiting in any manner, as one of ordinary skill in the art would recognize. The faces, when attached to each other, form a secure enclosure for a sensing device, preventing the tampering of the device once enclosed. The attachable front face may also serve to conceal or hide the display surface of the sensing device. The attachable front face may also prevent adjustment, unlocking, or removal of the sensing device. The sensing device may be placed in the case by first abutting the device to the back face and then attaching the front face. The front face may be attached by a clip-on mechanism, one or more screws, and/or other securing mechanism. The clip-on mechanism may include one or more protruding clips 222, e.g., on the back face, which may fit into one or more corresponding slots 224, e.g., in the front face (or vice-versa). A screw 226 may secure the front and back faces together. For example, the protruding clips 222 may secure an upper portion of the front face 220 to an upper portion of the back face 210. A portion of the screw 226 may pass through a hole in the front face 220 and attach to the back face 210, so that the screw 226 secures a lower portion of the front face 220 to a lower portion of the back face 210. Although a particular arrangement and combination of a particular number of clips 222 and screw 226 are described herein, other arrangements and combinations of other numbers of clips and screws may be used. For example, there may be additional clips 222 and slots 224 on other portions of the front and back faces with no screws being used, or there may be one or more screws with no clip-on mechanism being used, or other suitable securing mechanism(s) may be used. The attachable front face of the case may have one or more vents 230 to facilitate the flow of air through the case.

In particular embodiments, the case may include an aperture (labeled as a camera port 240 for the camera sensing device shown in FIGS. 2A and 2B) to allow the camera of the sensing device a field of view of the external environment of the enclosure. This field of view may be useful in the visual acquisition of the environment by the camera of the sensing device. Example uses include ridesharing, SLAM, geospatial mapping, or other applications. The size, shape, placement, number, and configuration of such an aperture(s) may change based on the type of sensing device that the case is configured to enclose, and embodiments of the present invention could incorporate any number, size, shape, or other configuration of apertures to allow the sensing device to sense the external environment as they are designed to do.

In particular embodiments, the case may also include an opening for a power cord 250, allowing the supply of electrical power to the sensing device and/or power-consuming components of the case. The opening 252 may be a hole in the front face 220 and/or the back face 210 through which the power cord 250 may pass. The power cord 250 is described below in further detail with reference to FIG. 5.

In particular embodiments, the case has an attachment surface 260, allowing it attach to the interior surface of an automobile through solid contact between the automobile surface and the attachment surface. The attachment surface may use chemical adhesives, suction, clamping, magnetic, electrostatic, or other means to maintain solid contact with an automobile interior surface.

FIG. 2B illustrates several features of particular embodiments of a secure, temperature-controlled case from a side view. In particular embodiments, the case may include one or more joints 270 connecting the case body to the attachment surface 260. The joints may allow the case body to have one or more degrees of rotational freedom, including yaw, roll, or tilt. The joints may be hinges, gimbals, universal joints, or other kinds of joints. The joint may also allow one or more translational degrees of freedom, including left-right, up-down, and back-forth. The joint may further comprise a piston, slide, or other such mechanism to accommodate translational degrees of freedom.

Figures 3A, 3B:
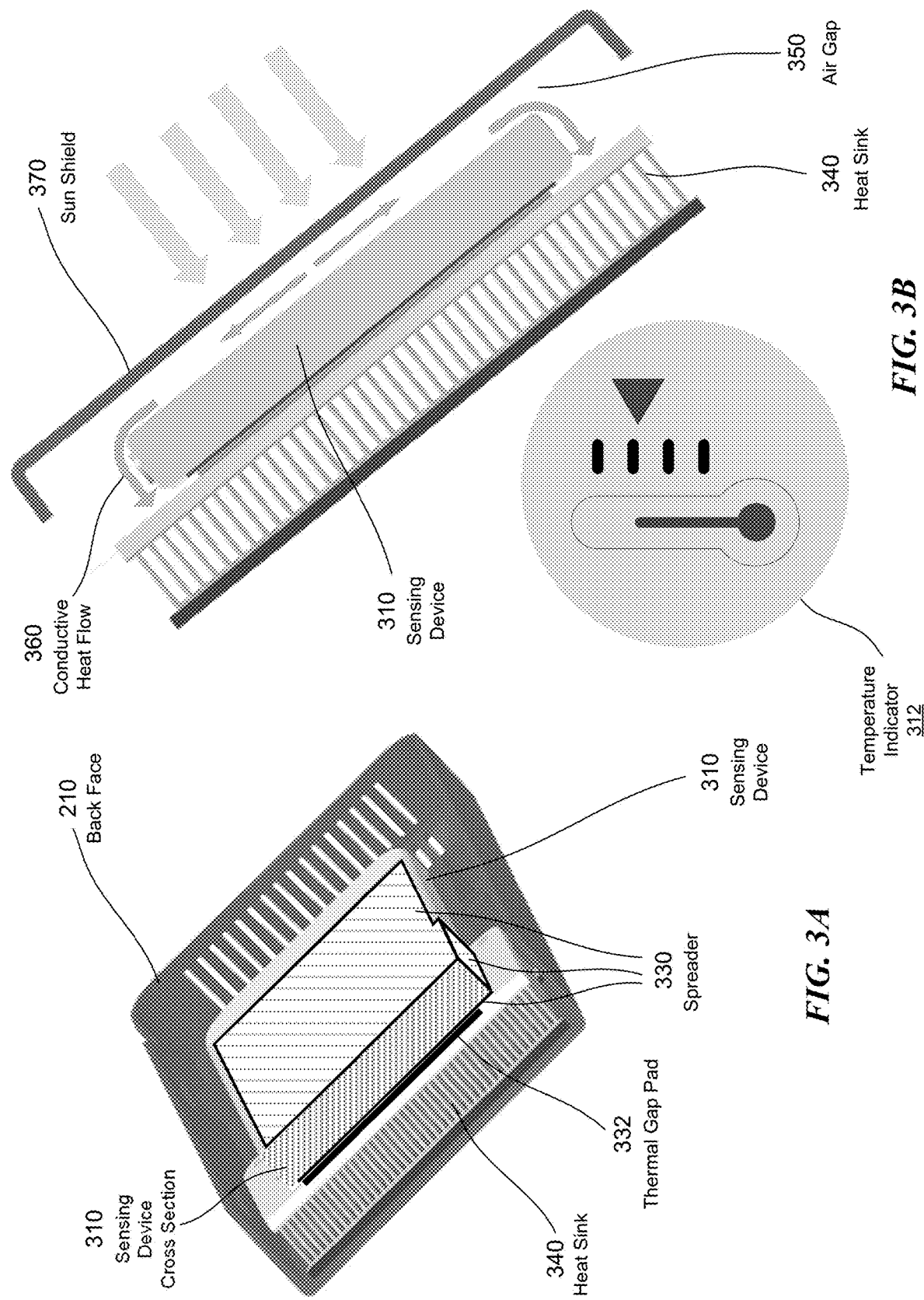

FIG. 3A illustrates several thermal management features of particular embodiments of a secure, temperature-controlled case. A sensing device 310 is enclosed in the back face 210 portion of a case body. The back face 210 is shown without the attachable front face 220 for illustrative purposes. The case body includes a spreader 330 comprised of a heat conducting material in contact with at least a portion of the sensing device. In preferred embodiments, the spreader 330 is comprised of a high thermal conductivity material, such as graphite. The spreader 330 covers and makes solid or thermal contact with at least a portion of the sensing device 310. For example, the spreader may make solid or thermal contact with a front portion of the sensing device, which may include at least a portion of the device's display. Additionally or alternatively, the spreader may make solid or thermal contact with a back portion of the sensing device. The spreader 330 may wrap around at least one of the sides of the sensing device to make solid or thermal contact with a heat sink 340, or with a thermal gap pad that makes solid or thermal contact with the heat sink 340. In this embodiment, the heat sink is located behind the front attachable face of the case. Heat conduction is therefore facilitated between the spreader 330 and heat sink. The spreader 330 conducts heat transferred from the surface or body of the sensing device to the heat sink. The heat sink additionally conducts heat from the portion of the sensing device with which it makes thermal contact. Thermal contact between any two components of the case, or between a component of the case and the sensing device, may be accomplished through solid contact, or the use of an intermediary heat-conducting material, such as a thermal paste and/or thermal gap pad.

FIG. 3B illustrates an example conductive mode of heat transfer by the spreader and heat sink in particular embodiments of the case. As indicated by the temperature indicator 312, solar radiation may be impinging on the sun shield 370 (e.g., the back face 210 of the case body), thus raising the case temperature. Furthermore, the sensing device 310 may generate heat while performing some computing or communication function, therefore increasing the possibility of exceeding a critical operating temperature range of the device. The sun shield 370 is separated from the sensing device by an air gap 350. The air gap acts as a layer of thermal insulation, allowing the sun shield 370 to absorb the solar radiation and store any resulting heat without conducting it to the sensing device. Any heat that is radiated onto the spreader or generated within the body of the sensing device is conducted 360 by the spreader to the heat sink 340 at the display-side of the sensing device. The fins of the heat sink then transfer the conducted heat 360 to the air in between the heat sink fins. Subsequently, the heat is removed from the enclosed volume of the case through the convective heat transfer of an impelled air flow which flows between the heat sink fins.

FIGS. 3C-3D illustrate a cross section of a case for a sensing device with impinging solar radiation, in accordance with particular embodiments. FIG. 3C shows a thermal spreader 330 in contact with at least a portion of a sensing device 310. The thermal spreader 330 is in contact with a display side of the sensing device 310 in this example, and conducts heat away from the sensing device 310 toward the heat sink 340. At least a portion of the thermal spreader 330 is in contact with at least a portion of a thermal gap pad 332, which may be formed from a softer material than the spreader 330, and may be attached to the sensing device 310 and/or the heat sink 340 via an adhesive such as glue or the like. The thermal gap pad 332 may be formed from, e.g., a polymer or other highly-conductive material. Thus, the thermal gap pad 332, if present, may conduct heat from the sensing device 310 to the heat sink 340. The heat sink 340 may be attached to a portion of the case, such as the back face 210, e.g., by screws or other fastening mechanism. FIG. 3D is similar to FIG. 3C, but shows a thermal spreader 330 that wraps around a portion of the sensing device 310. A first portion of the thermal spreader 330 is in contact with a display side of the sensing device 310 (above the thermal spreader 330) and a thermal gap pad 332 (below the thermal spreader 330). The thermal spreader 330 is folded or wrapped around the side of the sensing device 310, so that a second portion of the thermal spreader 330 may be in contact with a side of the sensing device 310 (the right side shown in FIG. 3D), and a third portion of the spreader 330 may be in contact with a back side of the sensing device (the top side shown in FIG. 3D). Wrapping the thermal spreader 330 around the device 310 in this way increases the surface area of the thermal spreader 330 that is in contact with the sensing device 310, resulting in increased heat dissipation from the sensing device 310. The thermal spreader is not necessarily affixed or attached to the sensing device 310, but may be held in place by frictional forces resulting from the contact between the thermal spreader 330 and the sensing device 310 and/or portions of the case.

Figure 3F:
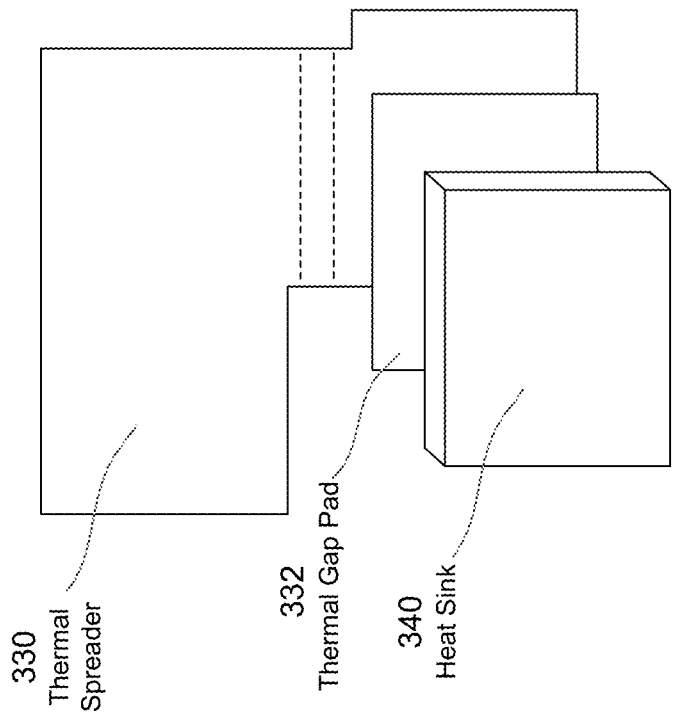
FIGS. 3E-3F illustrate a thermal spreader for a sensing device, in accordance with particular embodiments.
Figure 3E:
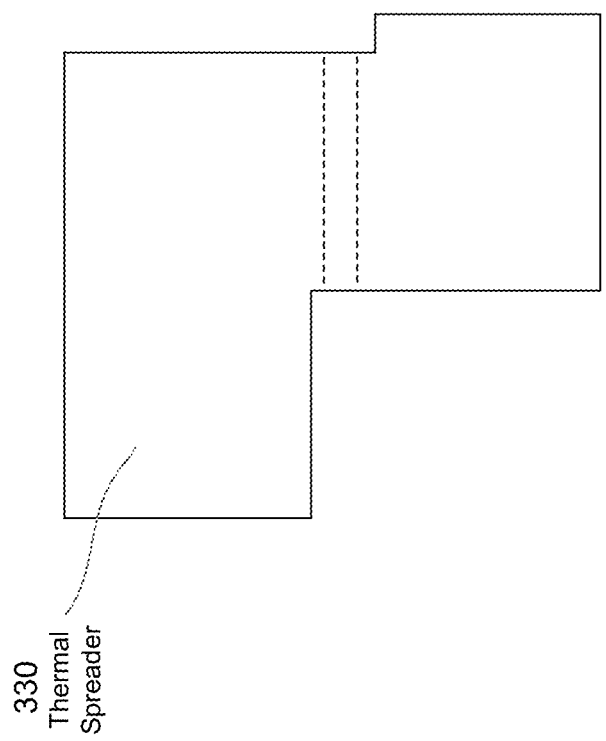

FIGS. 3E-3F illustrate a thermal spreader 330 for a sensing device 310, in accordance with particular embodiments. FIG. 3E shows a top (or bottom) view of the thermal spreader 330 in a flattened configuration. The thermal spreader 330 may be folded along the dashed lines to be wrapped around a sensing device 310, as shown in FIG. 3D. FIG. 3F shows an exploded view of a thermal gap pad 332 and indicates a position on the thermal spreader 330 on which at least a portion of the thermal gap pad 332 may be affixed or attached when in the case. Further, the thermal gap pad 332 may be affixed or attached to at least a portion of a heat sink 340 when in the case. The shape of the thermal spreader 330 allows a portion of the sensing device's display to be visible to a user, so that configuration or other operations may be performed using the device's screen (which may be touch-sensitive) while the sensing device 310 is in the case. Although particular shapes of the thermal spreader 330, thermal gap pad 332, and heat sink 340 are shown, the thermal spreader 330, thermal gap pad 332, and/or heat sink 340 may have other shapes, e.g., rectangular, square, circular, and so on.

Figure 4A:
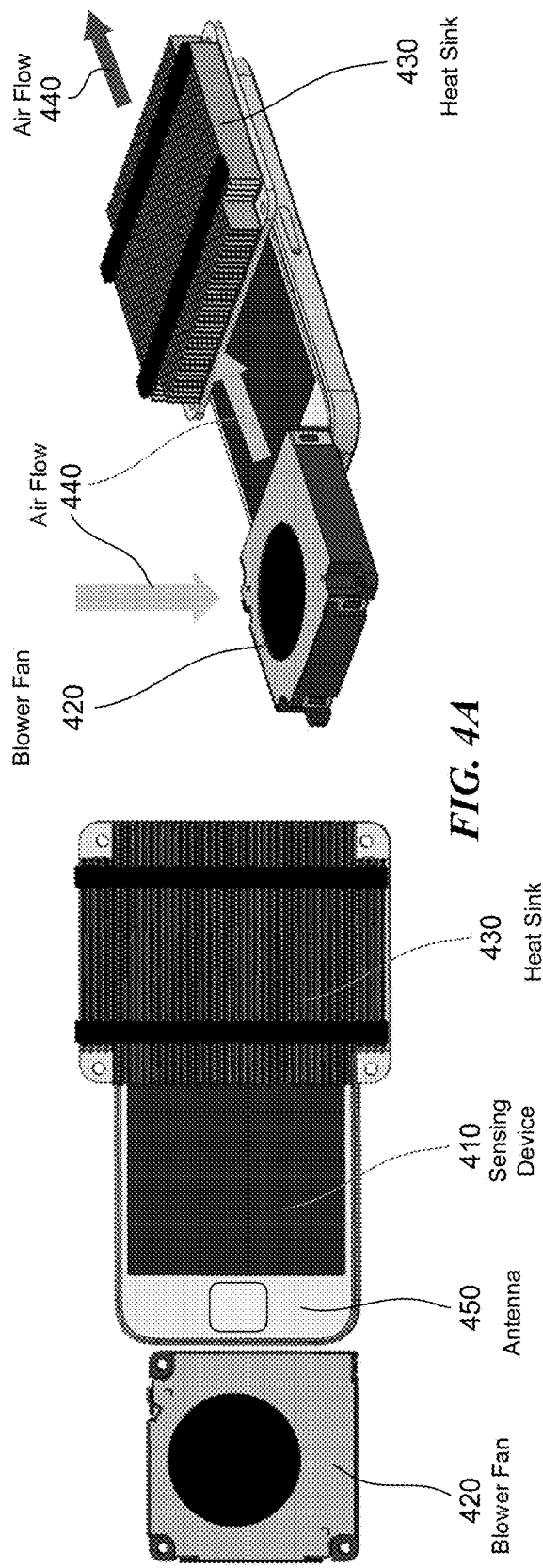
FIGS. 4A-4B illustrate a case for a sensing device with blower fan, convective channel, example mobile device, and heat sink, in accordance with particular embodiments.

FIG. 4A illustrates an example convective mode of heat transfer in particular embodiments of the case. A blower fan 420 impels an airflow 440 over the display surface of the sensing device 410. The air flow convectively cools the front surface of the sensing device before entering the finned portion of the heat sink 430. Further heat is accumulated by the impelled volume of air as it passes through the heat sink, which in turn has accumulated heat from the other areas of the case and sensing device. The accumulated heat includes heat transferred to the heat sink via heat conduction (e.g., from the spreader or the portion of the sensing device in solid or thermal contact with the heat sink). The impelled volume of air subsequently exits the enclosed volume of the case, transferring the accumulated heat to the ambient surroundings of the case.

In particular embodiments, the heat sink may be placed to be in solid or thermal contact with locations on the surface of the sensing device corresponding to its greatest heat dissipation (e.g., "hot spots"). These locations may correspond to the location of the central processing unit (CPU), graphics processing unit (GPU), RF communications hardware, or other heat dissipating ICs within the sensing device. The heat sink may also be located to be in solid or thermal contact with the portion of the sensing device surface corresponding to the location of the sensing device's own internal heat sink or other thermal management components. The display surface of the sensing device may allow the best heat conduction from the body of the device, and therefore may be a preferred location for placing the heat sink. In preferred embodiments, the heat sink is placed at a minimal distance from the CPU of the sensing device in order to conduct the greatest amount of heat from the CPU. An example placement would be to have the heat sink located directly adjacent to the CPU.

In particular embodiments, the heat sink may be placed as to minimize the absorption, reflection, scattering, or other interference with electromagnetic radiation to or from the sensing device. This may be to improve the RF communication functionality of the sensing device. As an example, in FIG. 4A, the antenna 450 of the sensing device is used for RF data transmission. The RF transmission of data may be used to transmit video, geospatial, or other data to a network or server. The network or server may be used to enable a distributed mapping or ridesharing application. As an example, the sensing device may capture live video, which is subsequently uploaded to an internet server via a wireless network accessed through the antenna 450. The internet server may collect many such uploaded video streams to create a digital map of the areas visited by the sensing device.

The RF antenna of the sensing device may be located within the device at a known location. In this example, the reflection of the antenna signal is minimized by placing the heat sink 430 towards the right end of the device, furthest from the antenna in the left end of the device. In this manner, the RF communication functionality of the sensing device and the heat dissipation function of the heat sink are made compatible. Furthermore, the blower fan may be placed as to avoid inhibiting the RF communication functionality of the sensing device. In particular embodiments, the blower fan is placed so that it is laterally displaced from the end of the sensing device containing the antenna.

In particular embodiments, the heat sink may be placed so that a portion of the display surface of the sensing device is visible to a user. The user may require visibility of the display surface while performing various tasks with the sensing device. These tasks may be performed before securing the front attachable face of the case and enclosing the sensing device. Such tasks may include calibration, initialization, setup, verification, maintenance, or other tasks. These tasks may be related to ridesharing, geospatial mapping, SLAM or other applications.

FIG. 4A illustrates how the heat sink may be placed to allow a portion of the screen to be visible to a user. In this embodiment, the heat sink can be placed to maximize heat transfer from the sensing device's heat-producing ICs while still allowing user interface functionality through the display. The heat sink may be placed in various locations along the surface of the display, depending on how much access to the display is required by a user in a given application scenario. The blower fan may also be placed to allow for a portion of the screen to be visible to a user.

For example, before the front portion of the case body is attached, the user may perform a calibration of the sensing device. The calibration may involve user interaction with a software application running on the sensing device. The software application may be configured to only use a portion of the device display area that is known to be visible, given the configuration of the heat sink. The user can complete the calibration task, using only the exposed portion of the device display, before attaching the front, attachable portion of the case body.

In this embodiment, the form factor of the case can be kept relatively compact, and the thermal management functionality of the case can be maintained by allowing the heat sink to contact the display surface of the sensing device. In other embodiments, where more display area needs to be visible, the case can be enlarged to accommodate a different configuration of the blower fan and heat sink, at the possible cost of case form factor and thermal management functionality.

In particular embodiments, the heat sink may be placed so that the entirety of the display surface of the sensing device is visible to a user. The user may require visibility of the entire display surface while performing various tasks with the sensing device. For example, a video collection task may require full-screen video to be displayed on the display of the sensing device. In this embodiment, the heat sink and other case components may be placed so that the device display is completely visible to a user. The heat sink may be placed in contact with the surface of the device on the opposite side from the display. The blower fan may consequently be placed so that the entirety of the device display is visible, and additionally so that a convective air flow can be impelled towards the heat sink. Such a configuration could be achieved by placing both the blower fan and heat sink on the side of the device opposite of its display surface (e.g., the side of the device facing away from the user). In this configuration, a convective flow channel could be formed between the non-display face of the sensing device and the case body.

Figure 4B:
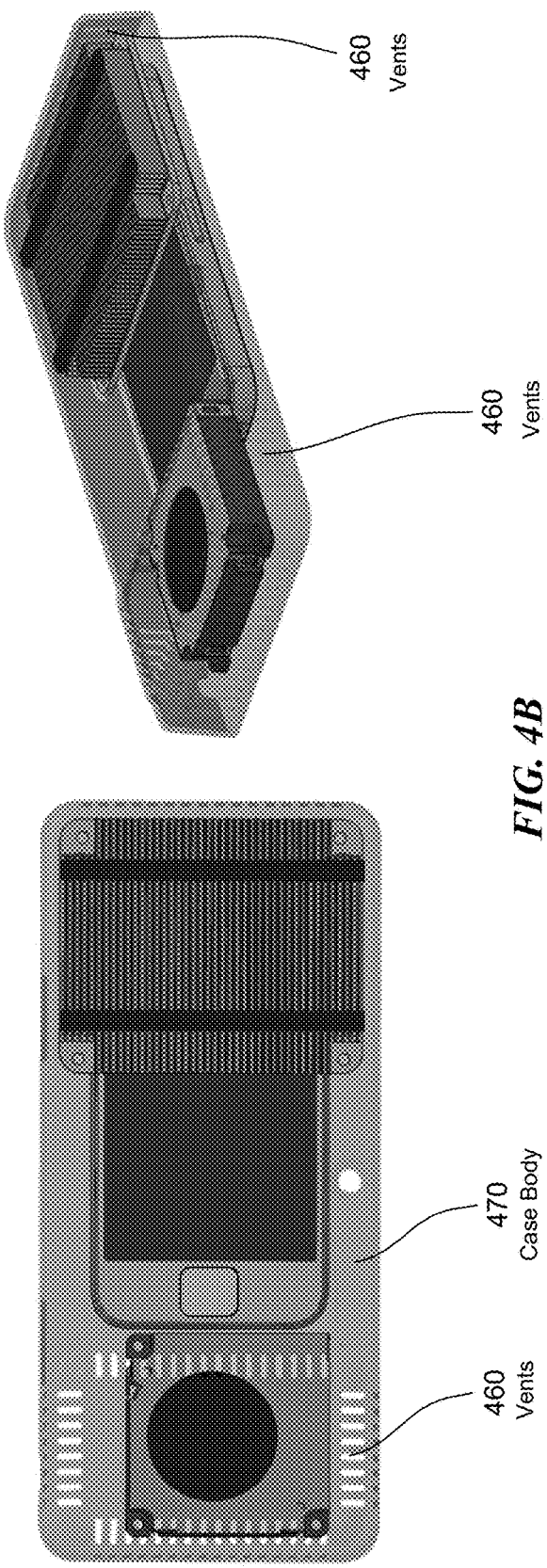

FIG. 4B illustrates example placement of the blower fan and heat sink within the body of the case 470. The blower fan may be adjacent to and flush with, or slightly offset in the direction normal to, the plane of the display of the sensing device. The blower fan is positioned so that one or more vents 460 in the case body can act as inlets for air flow. The impelled air flow can then be outlet through on or more vents after passing through the heat sink.

Figure 5:
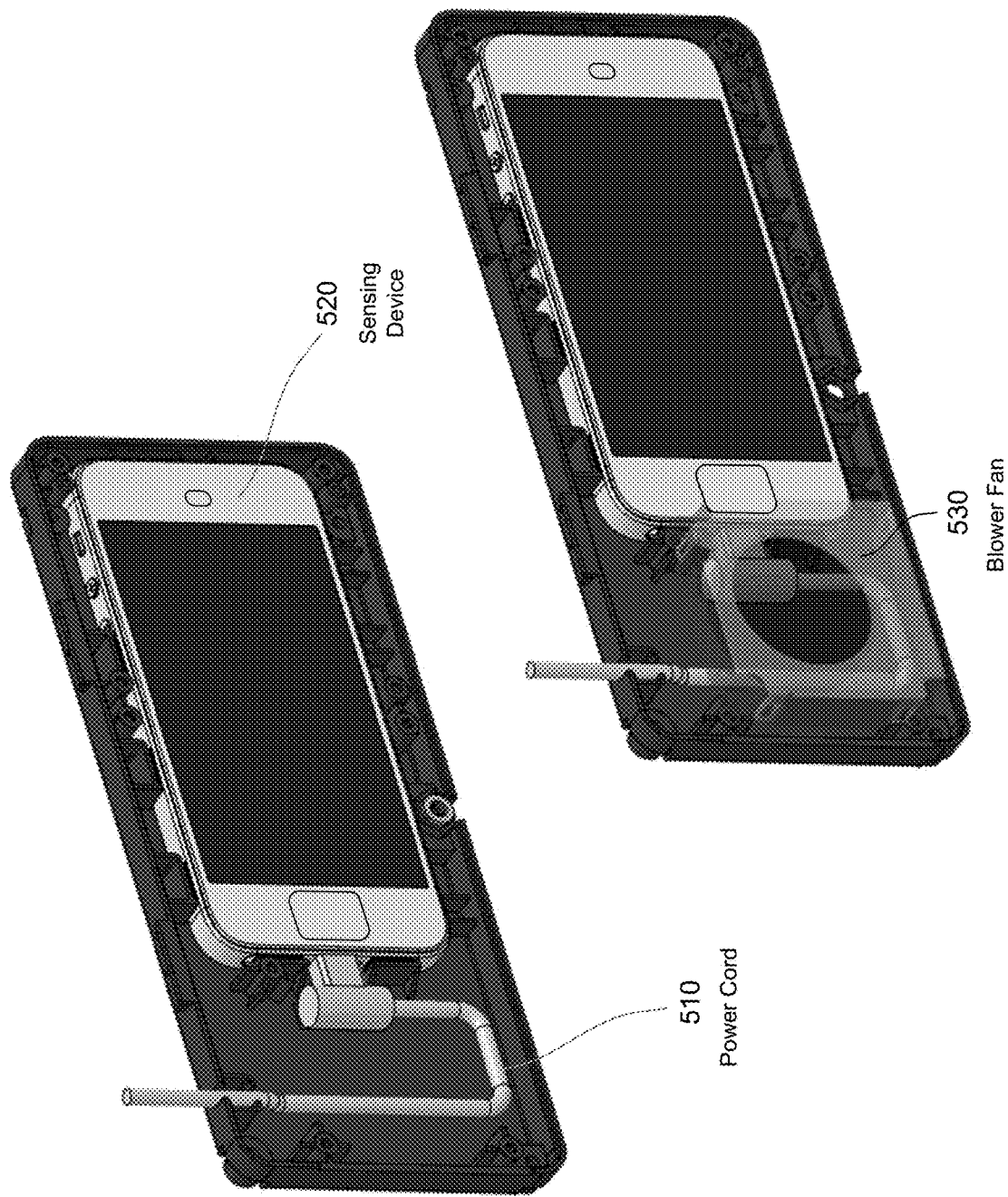
FIG. 5 illustrates a case for a sensing device with power cord for the sensing device and case blower fan, in accordance with particular embodiments.

FIG. 5 illustrates an example power cord 510 for active powering of the enclosed sensing device 520 and the blower fan 530. The power cord may supply electric current from the host automobile's auxiliary power outlet to both the sensing device and the blower fan of the secure, temperature-controlled case. Alternatively, or in combination, the power cord may supply electric current from a solar panel affixed to the exterior of the case body The power cord may have a range of socket varieties which supply a range of possible sensing devices. The power cord may also have one or more passive or active electrical components, junctions, or other components for converting the input voltage or current to the power input requirements of either the blower fan or the sensing device. The power cord may supply and recharge a battery for the blower fan.

The power cord 510 may have a mechanism for securing the cord to the case body or sensing device (e.g., to prevent yanking or disconnection). Examples of such mechanisms may be grommets, ferrules, fasteners, stanchions, conduits, or crimpers. The fastening mechanism may be attached to the power cord 510 to secure the power cord in place and prevent the power cord from moving in or out of the opening 252. The power cord 510 may fit tightly in the fastening mechanism so that friction or gripping force applied by the fastening mechanism holds the power cord 510 in place within the fastening mechanism. The fastening mechanism may be securely held in place by the front face 220 and/or the back face 210. For example, the fastening mechanism may be, e.g., a grommet made of rubber (or other material) that, when positioned in the opening 252, is held in place by upper and/or lower flange portions of the grommet. As another example, the fastening mechanism may be a plastic or rubber cylinder, or a plastic zip tie wrapped around the power cord tightly. The cylinder or zip tie may be held in place by the opening 252 and/or one or more protrusions in the front face 220 and/or the back face 210, e.g., one or more protrusions molded into the plastic shape of the back face that encloses a sufficient portion of the cylinder or zip tie so that the cylinder or zip tie does not move by more than a threshold distance. The protrusion(s) may have an opening narrower than the outer diameter of the cylinder or zip tie but wider than the outer diameter of the power cord 250, so that the power cord 250 can pass through the protrusion(s) into the interior of the case.

The cord may also be curved to prevent easy yanking or removal.

Figure 6:
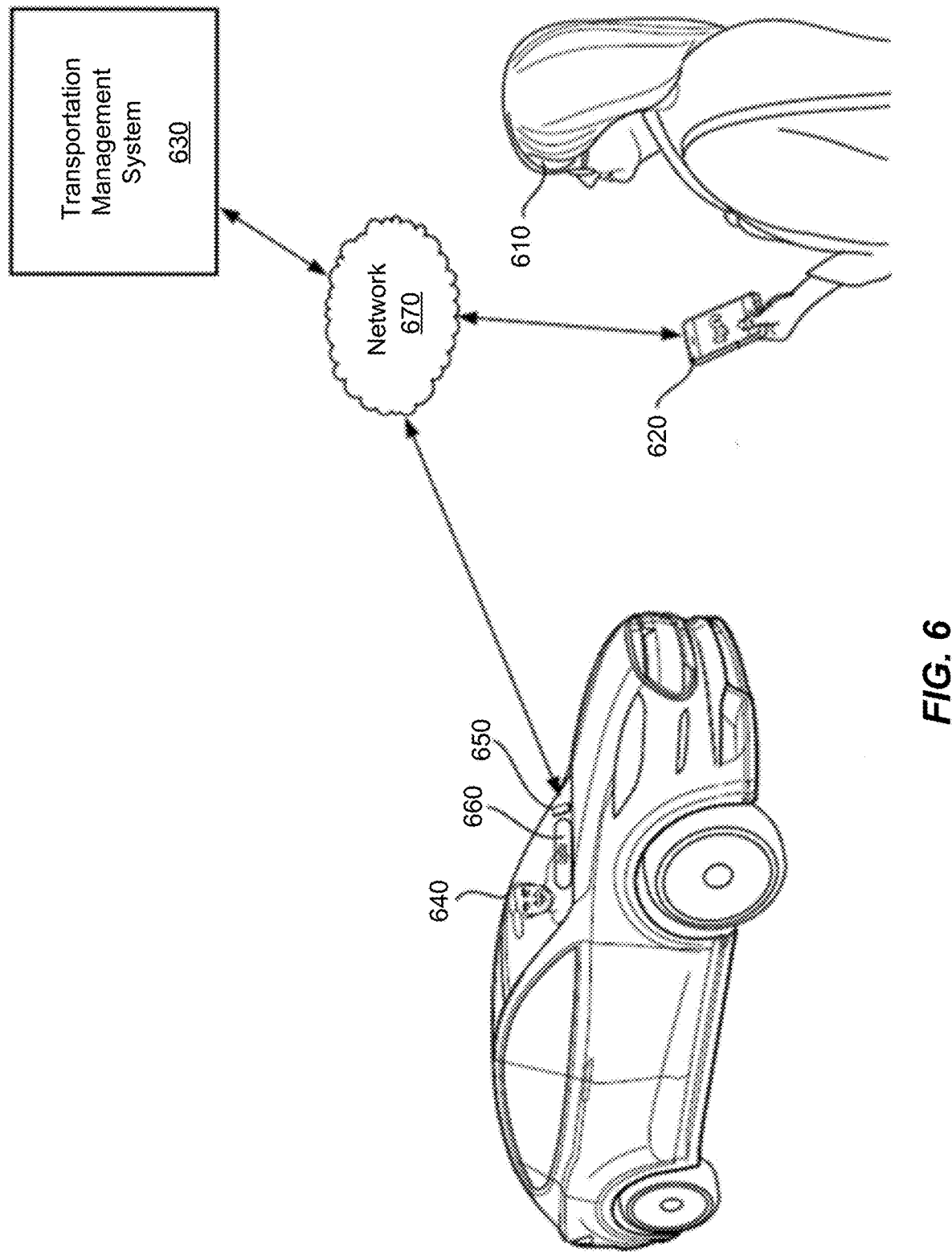
FIG. 6 illustrates an example of a transportation management system 630 for matching ride requestors and ride providers, in accordance with particular embodiments described herein.

FIG. 6 illustrates an example of a transportation management system 630 for matching ride requestors 610 and ride providers 640, in accordance with particular embodiments described herein. The transportation management system 630 may be configured to communicate with both the requestor's 610 computing device 620 and the provider's 640 computing device 650. The provider computing device 650 may be configured to communicate with a transportation management vehicle device 660 that is configured to easily and efficiently provide information to a provider 640 and/or a requestor 610, obtain internal sensor data pertaining to the passenger compartment of the vehicle, and/or adjust configurations of the vehicle.

In particular embodiments, the requestor 610 may use a transportation application running on a requestor computing device 620 to request a ride from a specified pick-up location to a specified drop-off location. The request may be sent over a communication network 670 to the transportation management system 630. The ride request may include request information, which may include, for example, an identifier associated with the requestor and/or the requestor computing device, user information associated with the requestor, a location of the requestor computing device at the time of the request, a requested time for the ride (e.g., at a scheduled future time or an instant/current time), and/or any other relevant information for matching the ride request with ride providers as described herein. The ride request may also include transport information, such as, e.g., a pick-up location, a drop-off location, a "best fit/predictive" location (e.g., a particular location in the origination/destination region suitable for pick-up/drop-off at a given time), preferred pick-up/drop-off location type (e.g., a curb segment), or any other suitable information for indicating the requestor's transportation preferences and/or objectives. In particular embodiments, the ride request may further include any other preferences or needs of the requestor, including, for example, navigation preferences (e.g., highways vs. local streets; particular routes; stop overs), music or entertainment preferences (e.g., link to a music playlist or station hosted by a 3rd-party music provider, news station, etc.), personalized pattern/color to display on a transportation management vehicle device to help the ride provider and requestor identify each other, particular vehicle features or restrictions (e.g., pet friendly, child seat, wheelchair accessible, maximum/minimum passenger or cargo compartment, etc.).

In particular embodiments, the transportation management system 630 may, in response to a ride request, identify available providers that are registered with the transportation management system 630 through an application installed on each of their respective mobile computing devices 650 or through an associated transportation management vehicle device 660. For example, the transportation management system 630 may locate candidate ride providers 640 who are available (e.g., based on a status indicator provided through each ride provider's 640 computing device 650) and in the general vicinity of the requested pick-up location (e.g., based on GPS data provided by the provider computing device 650 and the requestor computing device 620). The system 630 may further access various information about each candidate ride provider 640, including, for example, vehicle features (e.g., vehicle type, size, class, etc.), amenities, limitations of the vehicle, route for transporting other passengers in the vehicle in a ride-sharing scenario (e.g., the ride provider 640 may be in the process of transporting different, unrelated ride questors), schedule information regarding the ride provider's 640 future availability, diagnostics associated with the vehicle (e.g., gas level, battery level, engine status, etc.), and/or any other suitable information. In particular embodiments, the transportation management system 630 may match the information pertaining to each candidate ride provider 640 with the preferences/requirements specified in the ride request (e.g., preferred vehicle type/size, pick-up and drop-off locations, travel time constraints, etc.) and assign the candidate ride provider 640 a score that represents how good the match is. In particular embodiments, the transportation management system 630 may rank the candidate ride providers 640 based on their respective scores. In particular embodiments, the transportation management system 630 may select a number (e.g., 3, 5, 10, etc.) of top-ranking candidate ride providers 640 and inquire whether any of them is willing to fulfill the ride request. In particular embodiments, the system 630 may send notifications to those ride providers 640 one by one, in the order of their rankings (e.g., starting with the highest-ranked or best-matched one), until someone accepts. Alternatively, the system 630 may simultaneously send notifications to the selected top-ranking ride providers 640 and assign the first ride provider 640 who accepts to fulfill the ride request.

In particular embodiments, different types of information may be sent to the ride provider 640 and the ride requestor 610 during different stages of the ride-matching process. For example, the aforementioned notification for inquiring whether a ride provider 640 is interested in fulfilling a ride request may include, for example, the pick-up location of the ride request, estimated time of travel, fees for the ride, particular ride requirements (e.g., car seat availability), the ride requestor's 610 rating on the system 630, and any other pertinent information that would allow the ride provider 640 to make an informed decision as to whether to accept or reject the ride request. Upon seeing the notification, the provider 640 may accept or reject the ride request through the provider communication device 650. In particular embodiments, the provider computing device 650 may notify the transportation management system 630 that the provider 640 received the notification and further inform the system 630 of whether the provider 640 accepted or rejected the request. The information sent to the system 630 may include, for example, an acceptance indicator (e.g., a flag) and current location of the ride provider 640. In particular embodiments, the provider 640 may be predictively and/or automatically matched with a ride request such that the provider 640 is not required to explicitly accept the request. For instance, the provider 640 may enter a mode where the provider 640 agrees to accept all requests that are sent to the provider 640 without the ability to decline and/or review requests before accepting. Once a ride provider 640 accepts the ride request, the transportation management system may send the ride provider 640 additional information, such as the requestor's 610 profile information (e.g., name, profile picture, etc.), destination information, route from the requested origination location to the destination locations, navigation instructions to the pick-up location, and any other suitable information that would help the ride provider 640 fulfill the ride request.

In particular embodiments, after a ride provider 640 accepted the ride request, the transportation management system 630 may provide the ride requestor 610 information pertaining to the ride provider 640. The information may include, for example, the ride provider's 640 profile information (e.g., name, representative symbol or graphic, social-media profile picture, rating, past ride history and reviews, etc.), a suggested route from the requested origination location to the destination location, tracking information that indicates the ride provider's 640 current location, estimated fare, and/or any other relevant information that facilitates the transaction and informs the ride requestor 610 of what to expect.

In particular embodiments, the transportation management system 630 may provide information to the ride requestor device 620 and the provider device 650 (and/or transportation management vehicle device 660) to facilitate the parties finding each other. For example, the system 630 may monitor the GPS locations of the requestor computing device 620 and provider computing device 650 and make the GPS location of one device available to the other device. For example, as the provider computing device 650 gets closer to the request location, the transportation management system may monitor the location of the provider computing device 650 and send the location of the requestor computing device 620 to the provider computing device 650 (and vice versa). As such, the provider computing device 650 may display the current location of the requestor computing device 620 to allow the provider 640 find and pick-up the requestor 610. In particular embodiments, the provider computing device 650 may determine a proximity vector between the present location of the provider computing device 650 and the location of the requestor computing device 620. Based on this information, the provider computing device 650 may provide navigating instructions to the provider 640 so that the provider 640 may find the exact location of the requestor 610.

To further guide the provider 640, the transportation management system 630 and/or the provider computing device may determine and provide a proximity indicator (e.g., a color, pattern, image, animation, and/or pattern of colors) to be presented on a display visible to the provider 640. The display may be on the provider computing device 650, the transportation management vehicle device 660, and/or a display integrated with the vehicle. Proximity indicators may also include additional or other types of multimedia elements such as sounds, audio/visual presentations, haptic feedback (e.g., vibrations, etc.), holograms, augmented reality presentations, etc. For example, a haptic-feedback proximity indicator may cause devices within the vehicle (e.g., the computing device 650, the transportation management vehicle device 660, and/or components of the vehicle, such as the steering wheel) to vibrate. The vibration (or any other type of proximity indicator) may become stronger or weaker depending on the distance to the requestor computing device 620. The provider computing device 650 may present the proximity indicator so that the provider 640 may quickly and easily navigate to the location of the requestor 610. In particular embodiments, the provider computing device 650 may pass the proximity indicator to a transportation management vehicle device 660 that is configured to present the corresponding color, pattern, pattern of colors, animation, and/or image on a large display that can easily, intuitively, and safely be followed by the driver to the location of the requestor 610. The indicator provided by the transportation management vehicle device 660 may also be visible to the ride requestor 610 through the vehicle's windshield. In particular embodiments, the ride requestor 610, knowing or having been informed of the proximity indicator's characteristics (e.g., a particular color, greeting, animation, etc.), may look for such proximity indicator in nearby vehicles to find the ride provider 640. Similarly, the indicator may also be displayed on the requestor's computing device 620, and the requestor 610 may hold the device 620 so that nearby drivers could see the displayed proximity indicator for purposes of helping the parties locate each other.

In particular embodiments, an interaction indicator associated with the requestor 610 of a matched ride may be displayed based on the proximity between the requestor computing device 620 and the provider computing device 650. For example, when the parties are within a distance threshold of each other, an interaction indicator including a name, a graphic, and/or a greeting generated based on the requestor's information and/or provider's information may be presented on the provider computing device 650 and/or the transportation management vehicle device 660. Similar to the techniques described herein related to the proximity indicator, the interaction indicator may be displayed to provide a welcoming interaction to the requestor 610 upon the requestor 610 approaching and/or entering a vehicle of the provider 640. Similar to the proximity indicator, the interaction indicator may be displayed on any number of different displays within the provider vehicle and/or through the transportation management vehicle device 660. Additionally, the same techniques described herein regarding the provider computing device 650 may be implemented by the requestor computing device 620 to display an interaction indicator and/or proximity indicator on the requestor computing device 620 or an associated display.

Figure 7:
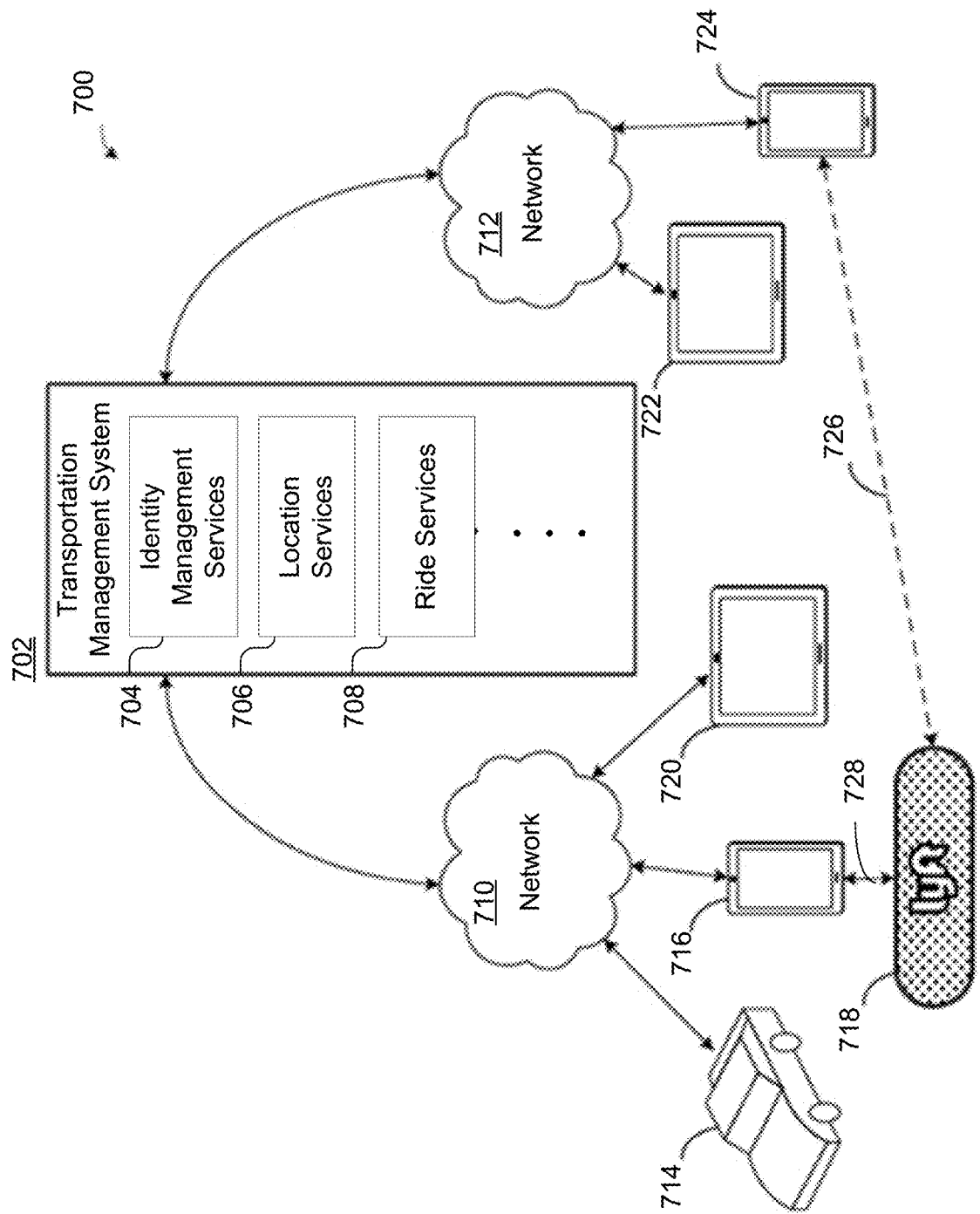
FIG. 7 shows a transportation management environment 700, in accordance with particular embodiments.

FIG. 7 shows a transportation management environment 700, in accordance with particular embodiments. For example, a transportation management system 702 executing on one or more servers or distributed systems may be configured to provide various services to ride requestors and providers. In particular embodiments, the transportation management system 702 may include software modules or applications, including, e.g., identity management services 704, location services 706, ride services 708, and/or any other suitable services. Although a particular number of services are shown as being provided by system 702, more or fewer services may be provided in various embodiments. In addition, although these services are shown as being provided by the system 702, all or a portion of any of the services may be processed in a distributed fashion. For example, computations associated with a service task may be performed by a combination of the transportation management system 702 (including any number of servers, databases, etc.), one or more devices associated with the provider (e.g., devices integrated with the managed vehicles 714, provider's computing devices 716 and tablets 720, and transportation management vehicle devices 718), and/or one or more devices associated with the ride requestor (e.g., the requestor's computing devices 724 and tablets 722). In particular embodiments, the transportation management system 702 may include one or more general purpose computers, server computers, distributed computing systems, clustered computing systems, cloud-based computing systems, or any other computing systems or arrangements of computing systems. The transportation management system 702 may be configured to run any or all of the services and/or software applications described herein. In particular embodiments, the transportation management system 702 may include an appropriate operating system as well as various server applications, such as web servers capable of handling hypertext transport protocol (HTTP) requests, file transfer protocol (FTP) servers, database servers, etc.

In particular embodiments, identity management services 704 may be configured to, e.g., perform authorization services for requestors and providers and manage their interactions and data with the transportation management system 702. This may include, e.g., authenticating the identity of providers and determining that they are authorized to provide services through the transportation management system 702. Similarly, requestors' identities may be authenticated to determine whether they are authorized to receive the requested services through the transportation management system 702. Identity management services 704 may also manage and control access to provider and requestor data maintained by the transportation management system 702, such as driving and/or ride histories, vehicle data, personal data, preferences, usage patterns as a ride provider and as a ride requestor, profile pictures, linked third-party accounts (e.g., credentials for music or entertainment services, social-networking systems, calendar systems, task-management systems, etc.) and any other associated information. The management service 704 may also manage and control access to provider/requestor data stored with and/or obtained from third-party systems. For example, a requester or provider may grant the transportation management system 702 access to a third-party email, calendar, or task management system (e.g., via the user's credentials). As another example, a requestor or provider may grant, through a mobile device (e.g., 716, 720, 722, and 724), a transportation application associated with the transportation management system 702 access to data provided by other applications installed on the mobile device. Such data may be processed on the client and/or uploaded to the transportation management system 702 for processing, if so desired.

In particular embodiments, the transportation management system 702 may provide location services 706, which may include navigation and/or traffic management services and user interfaces. For example, the location services 706 may be responsible for querying devices associated with the provider (e.g., vehicle 714, computing device 716, tablet 720, transportation management vehicle device 718) and the requester (e.g., computing device 724 and tablet 722) for their locations. The location services 706 may also be configured to track those devices to determine their relative proximities, generate relevant alerts (e.g., proximity is within a threshold distance), generate navigation recommendations, and any other location-based services.

In particular embodiments, the transportation management system 702 may provide ride services 708, which may include ride matching and management services to connect a requestor to a provider. For example, after the identity of a ride requestor has been authenticated by the identity management services module 704, the ride services module 708 may attempt to match the requestor with one or more ride providers. In particular embodiments, the ride services module 708 may identify an appropriate provider using location data obtained from the location services module 706. The ride services module 708 may use the location data to identify providers who are geographically close to the requestor (e.g., within a certain threshold distance or travel time) and further identify those who are a good match with the requestor. The ride services module 708 may implement matching algorithms that score providers based on, e.g.: preferences of providers and requestors; vehicle features, amenities, condition, and status; provider's preferred general travel direction, range of travel, and availability; requestor's origination and destination locations, time constraints, and vehicle feature needs; and any other pertinent information for matching requestors with providers. In particular embodiments, the ride services 708 may use rule-based algorithms or machine-learning models for matching requestors and providers.

The transportation management system 702 may communicatively connect to various devices through networks 710 and 712. Networks 710, 712 may include any combination of interconnected networks configured to send and/or receive data communications using various communication protocols and transmission technologies. In particular embodiments, networks 710, 712 may include local area networks (LAN), wide-area network, and/or the Internet, and may support communication protocols such as transmission control protocol/Internet protocol (TCP/IP), Internet packet exchange (IPX), systems network architecture (SNA), and any other suitable network protocols. In particular embodiments, data may be transmitted through networks 710, 712 using a mobile network (such as a mobile telephone network, cellular network, satellite network, or another mobile network), PSTNs (a public switched telephone networks), wired communication protocols (e.g., USB, CAN), and/or wireless communication protocols (e.g., WLAN technologies implementing the IEEE 802.11 family of standards, Bluetooth, Bluetooth Low Energy, NFC, Z-Wave, and ZigBee). In particular embodiments, networks 710, 712 may each include any combination of networks described herein or known to one of ordinary skill in the art.

In particular embodiments, devices within a vehicle may be interconnected. For example, any combination of the following may be communicatively connected: vehicle 714, provider computing device 716, provider tablet 720, transportation management vehicle device 718, requestor computing device 724, requestor tablet 722, and any other device (e.g., smart watch, smart tags, etc.). For example, the transportation management vehicle device 718 may be communicatively connected to the provider computing device 716 and/or the requestor computing device 724. The transportation management vehicle device 718 may connect 726, 728 to those devices via any suitable communication technology, including, e.g., WLAN technologies implementing the IEEE 802.11 family of standards, Bluetooth, Bluetooth Low Energy, NFC, Z-Wave, ZigBee, and any other suitable short-range wireless communication technology.

In particular embodiments, users may utilize and interface with one or more services provided by the transportation management system 702 using applications executing on their respective computing devices (e.g., 714, 716, 718, and/or 720), which may include mobile devices (e.g., an iPhone®, an iPad®, mobile telephone, tablet computer, a personal digital assistant (PDA)), laptops, wearable devices (e.g., smart watch, smart glasses, head mounted displays, etc.), thin client devices, gaming consoles, and any other computing devices. In particular embodiments, provider computing device 714 may be an add-on device to the vehicle, such as a vehicle navigation system, or a computing device that is integrated with the vehicle, such as the management system of an autonomous vehicle. The computing device may run on any suitable operating systems, such as Android®, iOS®, macOS®, Windows®, Linux®, UNIX®, or UNIX®-based or Linux®-based operating systems, or any other type of operating system or firmware. The computing device may further be configured to send and receive data over the Internet, short message service (SMS), email, and various other messaging applications and/or communication protocols. In particular embodiments, one or more software applications may be installed on the computing device of a provider or requestor, including an application associated with the transportation management system 702. The transportation application may, for example, be distributed by an entity associated with the transportation management system via any distribution channel, such as an online source from which applications may be downloaded and/or via physical media, such as CDs and DVDs. Additional third-party applications unassociated with the transportation management system may also be installed on the computing device. In particular embodiments, the transportation application may communicate or share data and resources with one or more of the installed third-party applications.

Figure 8:
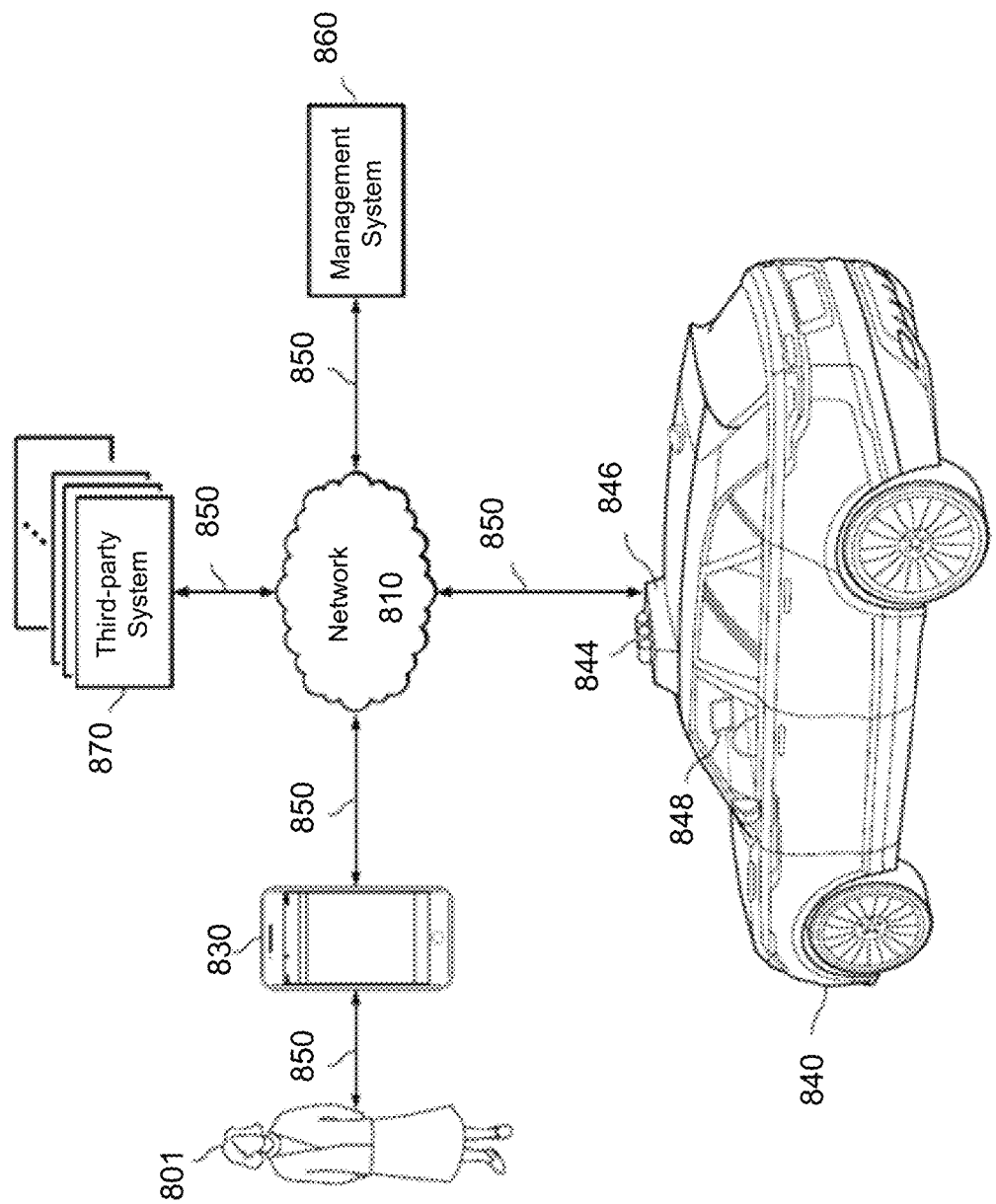
FIG. 8 illustrates an example block diagram of a transportation management environment for matching ride requestors with autonomous vehicles, in accordance with particular embodiments.

FIG. 8 illustrates an example block diagram of a transportation management environment for matching ride requestors with autonomous vehicles. In particular embodiments, the environment may include various computing entities, such as a user computing device 830 of a user 801 (e.g., a ride provider or requestor), a transportation management system 860, an autonomous vehicle 840, and one or more third-party system 870. The computing entities may be communicatively connected over any suitable network 810. As an example and not by way of limitation, one or more portions of network 810 may include an ad hoc network, an extranet, a virtual private network (VPN), a local area network (LAN), a wireless LAN (WLAN), a wide area network (WAN), a wireless WAN (WWAN), a metropolitan area network (MAN), a portion of the Internet, a portion of Public Switched Telephone Network (PSTN), a cellular network, or a combination of any of the above. In particular embodiments, any suitable network arrangement and protocol enabling the computing entities to communicate with each other may be used. Although FIG. 8 illustrates a single user device 830, a single transportation management system 860, a single vehicle 840, a plurality of third-party systems 870, and a single network 810, this disclosure contemplates any suitable number of each of these entities. As an example and not by way of limitation, the network environment may include multiple users 801, user devices 830, transportation management systems 860, autonomous-vehicles 840, third-party systems 870, and networks 810.

The user device 830, transportation management system 860, autonomous vehicle 840, and third-party system 870 may be communicatively connected or co-located with each other in whole or in part. These computing entities may communicate via different transmission technologies and network types. For example, the user device 830 and the vehicle 840 may communicate with each other via a cable or short-range wireless communication (e.g., Bluetooth, NFC, WI-FI, etc.), and together they may be connected to the Internet via a cellular network that is accessible to either one of the devices (e.g., the user device 830 may be a smartphone with LTE connection). The transportation management system 860 and third-party system 870, on the other hand, may be connected to the Internet via their respective LAN/WLAN networks and Internet Service Providers (ISP). FIG. 8 illustrates transmission links 850 that connect user device 830, autonomous vehicle 840, transportation management system 860, and third-party system 870 to communication network 810. This disclosure contemplates any suitable transmission links 850, including, e.g., wire connections (e.g., USB, Lightning, Digital Subscriber Line (DSL) or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof. In particular embodiments, one or more links 850 may connect to one or more networks 810, which may include in part, e.g., ad-hoc network, the Intranet, extranet, VPN, LAN, WLAN, WAN, WWAN, MAN, PSTN, a cellular network, a satellite network, or any combination thereof. The computing entities need not necessarily use the same type of transmission link 850. For example, the user device 830 may communicate with the transportation management system via a cellular network and the Internet, but communicate with the autonomous vehicle 840 via Bluetooth or a physical wire connection.

In particular embodiments, the transportation management system 860 may fulfill ride requests for one or more users 801 by dispatching suitable vehicles. The transportation management system 860 may receive any number of ride requests from any number of ride requestors 801. In particular embodiments, a ride request from a ride requestor 801 may include an identifier that identifies the ride requestor in the system 860. The transportation management system 860 may use the identifier to access and store the ride requestor's 801 information, in accordance with the requestor's 801 privacy settings. The ride requestor's 801 information may be stored in one or more data stores (e.g., a relational database system) associated with and accessible to the transportation management system 860. In particular embodiments, ride requestor information may include profile information about a particular ride requestor 801. In particular embodiments, the ride requestor 801 may be associated with one or more categories or types, through which the ride requestor 801 may be associated with aggregate information about certain ride requestors of those categories or types. Ride information may include, for example, preferred pick-up and drop-off locations, driving preferences (e.g., safety comfort level, preferred speed, rates of acceleration/deceleration, safety distance from other vehicles when travelling at various speeds, route, etc.), entertainment preferences and settings (e.g., preferred music genre or playlist, audio volume, display brightness, etc.), temperature settings, whether conversation with the driver is welcomed, frequent destinations, historical riding patterns (e.g., time of day of travel, starting and ending locations, etc.), preferred language, age, gender, or any other suitable information. In particular embodiments, the transportation management system 860 may classify a user 801 based on known information about the user 801 (e.g., using machine-learning classifiers), and use the classification to retrieve relevant aggregate information associated with that class. For example, the system 860 may classify a user 801 as a young adult and retrieve relevant aggregate information associated with young adults, such as the type of music generally preferred by young adults.

Transportation management system 860 may also store and access ride information. Ride information may include locations related to the ride, traffic data, route options, optimal pick-up or drop-off locations for the ride, or any other suitable information associated with a ride. As an example and not by way of limitation, when the transportation management system 860 receives a request to travel from San Francisco International Airport (SFO) to Palo Alto, Calif., the system 860 may access or generate any relevant ride information for this particular ride request. The ride information may include, for example, preferred pick-up locations at SFO; alternate pick-up locations in the event that a pick-up location is incompatible with the ride requestor (e.g., the ride requestor may be disabled and cannot access the pick-up location) or the pick-up location is otherwise unavailable due to construction, traffic congestion, changes in pick-up/drop-off rules, or any other reason; one or more routes to navigate from SFO to Palo Alto; preferred off-ramps for a type of user; or any other suitable information associated with the ride. In particular embodiments, portions of the ride information may be based on historical data associated with historical rides facilitated by the system 860. For example, historical data may include aggregate information generated based on past ride information, which may include any ride information described herein and telemetry data collected by sensors in autonomous vehicles and/or user devices. Historical data may be associated with a particular user (e.g., that particular user's preferences, common routes, etc.), a category/class of users (e.g., based on demographics), and/or all users of the system 860. For example, historical data specific to a single user may include information about past rides that particular user has taken, including the locations at which the user is picked up and dropped off, music the user likes to listen to, traffic information associated with the rides, time of the day the user most often rides, and any other suitable information specific to the user. As another example, historical data associated with a category/class of users may include, e.g., common or popular ride preferences of users in that category/class, such as teenagers preferring pop music, ride requestors who frequently commute to the financial district may prefer to listen to the news, etc. As yet another example, historical data associated with all users may include general usage trends, such as traffic and ride patterns. Using historical data, the system 860 in particular embodiments may predict and provide ride suggestions in response to a ride request. In particular embodiments, the system 860 may use machine-learning, such as neural networks, regression algorithms, instance-based algorithms (e.g., k-Nearest Neighbor), decision-tree algorithms, Bayesian algorithms, clustering algorithms, association-rule-learning algorithms, deep-learning algorithms, dimensionality-reduction algorithms, ensemble algorithms, and any other suitable machine-learning algorithms known to persons of ordinary skill in the art. The machine-learning models may be trained using any suitable training algorithm, including supervised learning based on labeled training data, unsupervised learning based on unlabeled training data, and/or semi-supervised learning based on a mixture of labeled and unlabeled training data.

In particular embodiments, transportation management system 860 may include one or more server computers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, transportation management system 860 may include one or more data stores. The data stores may be used to store various types of information, such as ride information, ride requestor information, ride provider information, historical information, third-party information, or any other suitable type of information. In particular embodiments, the information stored in the data stores may be organized according to specific data structures. In particular embodiments, each data store may be a relational, columnar, correlation, or any other suitable type of database system. Although this disclosure describes or illustrates particular types of databases, this disclosure contemplates any suitable types of databases. Particular embodiments may provide interfaces that enable a user device 830 (which may belong to a ride requestor or provider), a transportation management system 860, vehicle system 840, or a third-party system 870 to process, transform, manage, retrieve, modify, add, or delete the information stored in the data store.

In particular embodiments, transportation management system 860 may include an authorization server (or any other suitable component(s)) that allows users 801 to opt-in to or opt-out of having their information and actions logged, recorded, or sensed by transportation management system 860 or shared with other systems (e.g., third-party systems 870). In particular embodiments, a user 801 may opt-in or opt-out by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users 801 of transportation management system 860 through blocking, data hashing, anonymization, or other suitable techniques as appropriate.

In particular embodiments, third-party system 870 may be a network-addressable computing system that may provide D maps or host GPS maps, customer reviews, music or content, weather information, or any other suitable type of information. Third-party system 870 may generate, store, receive, and send relevant data, such as, for example, map data, customer review data from a customer review website, weather data, or any other suitable type of data. Third-party system 870 may be accessed by the other computing entities of the network environment either directly or via network 810. For example, user device 830 may access the third-party system 870 via network 810, or via transportation management system 860. In the latter case, if credentials are required to access the third-party system 870, the user 801 may provide such information to the transportation management system 860, which may serve as a proxy for accessing content from the third-party system 870.

In particular embodiments, user device 830 may be a sensing device such as a smartphone, tablet computer, or laptop computer. User device 830 may include one or more processors (e.g., CPU and/or GPU), memory, and storage. An operating system and applications may be installed on the user device 830, such as, e.g., a transportation application associated with the transportation management system 860, applications associated with third-party systems 870, and applications associated with the operating system. User device 830 may include functionality for determining its location, direction, or orientation, based on integrated sensors such as GPS, compass, gyroscope, or accelerometer. User device 830 may also include wireless transceivers for wireless communication and may support wireless communication protocols such as Bluetooth, near-field communication (NFC), infrared (IR) communication, WI-FI, and/or 2G/3G/4G/LTE mobile communication standard. User device 830 may also include one or more cameras, scanners, touchscreens, microphones, speakers, and any other suitable input-output devices.

In particular embodiments, the vehicle 840 may be an autonomous vehicle and equipped with an array of sensors 844, a navigation system 846, and a ride-service computing device 848. In particular embodiments, a fleet of autonomous vehicles 840 may be managed by the transportation management system 860. The fleet of autonomous vehicles 840, in whole or in part, may be owned by the entity associated with the transportation management system 860, or they may be owned by a third-party entity relative to the transportation management system 860. In either case, the transportation management system 860 may control the operations of the autonomous vehicles 840, including, e.g., dispatching select vehicles 840 to fulfill ride requests, instructing the vehicles 840 to perform select operations (e.g., head to a service center or charging/fueling station, pull over, stop immediately, self-diagnose, lock/unlock compartments, change music station, change temperature, and any other suitable operations), and instructing the vehicles 840 to enter select operation modes (e.g., operate normally, drive at a reduced speed, drive under the command of human operators, and any other suitable operational modes).

In particular embodiments, the autonomous vehicles 840 may receive data from and transmit data to the transportation management system 860 and the third-party system 870. Example of received data may include, e.g., instructions, new software or software updates, maps, 3D models, trained or untrained machine-learning models, location information (e.g., location of the ride requestor, the autonomous vehicle 840 itself, other autonomous vehicles 840, and target destinations such as service centers), navigation information, traffic information, weather information, entertainment content (e.g., music, video, and news) ride requestor information, ride information, and any other suitable information. Examples of data transmitted from the autonomous vehicle 840 may include, e.g., telemetry and sensor data, determinations/decisions based on such data, vehicle condition or state (e.g., battery/fuel level, tire and brake conditions, sensor condition, speed, odometer, etc.), location, navigation data, passenger inputs (e.g., through a user interface in the vehicle 840, passengers may send/receive data to the transportation management system 860 and/or third-party system 870), and any other suitable data.

In particular embodiments, autonomous vehicles 840 may also communicate with each other as well as other traditional human-driven vehicles, including those managed and not managed by the transportation management system 860. For example, one vehicle 840 may communicate with another vehicle data regarding their respective location, condition, status, sensor reading, and any other suitable information. In particular embodiments, vehicle-to-vehicle communication may take place over direct short-range wireless connection (e.g., WI-FI, Bluetooth, NFC) and/or over a network (e.g., the Internet or via the transportation management system 860 or third-party system 870).

In particular embodiments, an autonomous vehicle 840 may obtain and process sensor/telemetry data. Such data may be captured by any suitable sensors. For example, the vehicle 840 may have aa Light Detection and Ranging (LiDAR) sensor array of multiple LiDAR transceivers that are configured to rotate 360°, emitting pulsed laser light and measuring the reflected light from objects surrounding vehicle 840. In particular embodiments, LiDAR transmitting signals may be steered by use of a gated light valve, which may be a MEMs device that directs a light beam using the principle of light diffraction. Such a device may not use a gimbaled mirror to steer light beams in 360° around the autonomous vehicle. Rather, the gated light valve may direct the light beam into one of several optical fibers, which may be arranged such that the light beam may be directed to many discrete positions around the autonomous vehicle. Thus, data may be captured in 360° around the autonomous vehicle, but no rotating parts may be necessary. A LiDAR is an effective sensor for measuring distances to targets, and as such may be used to generate a three-dimensional (3D) model of the external environment of the autonomous vehicle 840. As an example and not by way of limitation, the 3D model may represent the external environment including objects such as other cars, curbs, debris, objects, and pedestrians up to a maximum range of the sensor arrangement (e.g., 50, 100, or 200 meters). As another example, the autonomous vehicle 840 may have optical cameras pointing in different directions. The cameras may be used for, e.g., recognizing roads, lane markings, street signs, traffic lights, police, other vehicles, and any other visible objects of interest. To enable the vehicle 840 to "see" at night, infrared cameras may be installed. In particular embodiments, the vehicle may be equipped with stereo vision for, e.g., spotting hazards such as pedestrians or tree branches on the road. As another example, the vehicle 840 may have radars for, e.g., detecting other vehicles and/or hazards afar. Furthermore, the vehicle 840 may have ultrasound equipment for, e.g., parking and obstacle detection. In addition to sensors enabling the vehicle 840 to detect, measure, and understand the external world around it, the vehicle 840 may further be equipped with sensors for detecting and self-diagnosing the vehicle's own state and condition. For example, the vehicle 840 may have wheel sensors for, e.g., measuring velocity; global positioning system (GPS) for, e.g., determining the vehicle's current geolocation; and/or inertial measurement units, accelerometers, gyroscopes, and/or odometer systems for movement or motion detection. While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieved using any combination of sensors. For example, an autonomous vehicle 840 may build a 3D model of its surrounding based on data from its LiDAR, radar, sonar, and cameras, along with a pre-generated map obtained from the transportation management system 860 or the third-party system 870. Although sensors 844 appear in a particular location on autonomous vehicle 840 in FIG. 8, sensors 844 may be located in any suitable location in or on autonomous vehicle 840. Example locations for sensors include the front and rear bumpers, the doors, the front windshield, on the side panel, or any other suitable location.

In particular embodiments, the autonomous vehicle 840 may be equipped with a processing unit (e.g., one or more CPUs and GPUs), memory, and storage. The vehicle 840 may thus be equipped to perform a variety of computational and processing tasks, including processing the sensor data, extracting useful information, and operating accordingly. For example, based on images captured by its cameras and a machine-vision model, the vehicle 840 may identify particular types of objects captured by the images, such as pedestrians, other vehicles, lanes, curbs, and any other objects of interest.

In particular embodiments, the autonomous vehicle 840 may have a navigation system 846 responsible for safely navigating the autonomous vehicle 840. In particular embodiments, the navigation system 846 may take as input any type of sensor data from, e.g., a Global Positioning System (GPS) module, inertial measurement unit (IMU), LiDAR sensors, optical cameras, radio frequency (RF) transceivers, or any other suitable telemetry or sensory mechanisms. The navigation system 846 may also utilize, e.g., map data, traffic data, accident reports, weather reports, instructions, target destinations, and any other suitable information to determine navigation routes and particular driving operations (e.g., slowing down, speeding up, stopping, swerving, etc.). In particular embodiments, the navigation system 846 may use its determinations to control the vehicle 840 to operate in prescribed manners and to guide the autonomous vehicle 840 to its destinations without colliding into other objects. Although the physical embodiment of the navigation system 846 (e.g., the processing unit) appears in a particular location on autonomous vehicle 840 in FIG. 8, navigation system 846 may be located in any suitable location in or on autonomous vehicle 840. Example locations for navigation system 846 include inside the cabin or passenger compartment of autonomous vehicle 840, near the engine/battery, near the front seats, rear seats, or in any other suitable location.

In particular embodiments, the autonomous vehicle 840 may be equipped with a ride-service computing device 848, which may be a tablet or any other suitable device installed by transportation management system 860 to allow the user to interact with the autonomous vehicle 840, transportation management system 860, other users 801, or third-party systems 870. In particular embodiments, installation of ride-service computing device 848 may be accomplished by placing the ride-service computing device 848 inside autonomous vehicle 840, and configuring it to communicate with the vehicle 840 via a wire or wireless connection (e.g., via Bluetooth). Although FIG. 8 illustrates a single ride-service computing device 848 at a particular location in autonomous vehicle 840, autonomous vehicle 840 may include several ride-service computing devices 848 in several different locations within the vehicle. As an example and not by way of limitation, autonomous vehicle 840 may include four ride-service computing devices 848 located in the following places: one in front of the front-left passenger seat (e.g., driver's seat in traditional U.S. automobiles), one in front of the front-right passenger seat, one in front of each of the rear-left and rear-right passenger seats. In particular embodiments, ride-service computing device 848 may be detachable from any component of autonomous vehicle 840. This may allow users to handle ride-service computing device 848 in a manner consistent with other tablet computing devices. As an example and not by way of limitation, a user may move ride-service computing device 848 to any location in the cabin or passenger compartment of autonomous vehicle 840, may hold ride-service computing device 848, or handle ride-service computing device 848 in any other suitable manner. Although this disclosure describes providing a particular computing device in a particular manner, this disclosure contemplates providing any suitable computing device in any suitable manner.

What is claimed is:

1. A temperature-controlled enclosure capable of securing a sensing device, the temperature-controlled enclosure, comprising:
    an exterior body capable of dissipating heat from the sensing device, the exterior body including:
        a plurality of sides configured to enclose at least a portion of the sensing device, and
        a removable cover configured to allow at least a portion of a display of the sensing device to be accessible when the removable cover is removed from the exterior body:
    a heat sink structure at least partially enclosed by the exterior body; and
    a heat-conducting material thermally coupled to the heat sink structure, wherein the heat-conducting material is configured to be in thermal contact with at least a portion of the sensing device.

2. The temperature-controlled enclosure of claim 1, wherein the heat-conducting material is configured to be in thermal contact with at least a portion of the display of the sensing device.

3. The temperature-controlled enclosure of claim 1, wherein the heat-conducting material is configured to be in thermal contact with at least a portion of a surface of the sensing device.

4. The temperature-controlled enclosure of claim 1, wherein the heat sink structure includes a thermal-conducting material different from heat-conducting material.

5. The temperature-controlled enclosure of claim 1, further comprising a fan configured to direct air through the heat sink structure.

6. The temperature-controlled enclosure of claim 5, wherein the fan is positioned within the temperature-controlled enclosure so as to preclude obscuring a predesignated location on a surface of the sensing device.

7. The temperature-controlled enclosure of claim 5, further comprising:
    a flow channel between the fan and the heat sink structure, wherein the flow channel is between a portion of an exterior surface of the sensing device and an interior surface of the temperature-controlled enclosure.

8. The temperature-controlled enclosure of claim 1, wherein the removable cover further comprises one or more vents configured to allow airflow to the sensing device.

9. A temperature-controlled enclosure capable of securing a sensing device including an image sensor, the temperature-controlled enclosure, comprising:

an exterior body capable of dissipating heat from the sensing device, the exterior body including a plurality of sides configured to enclose at least a portion of the sensing device, wherein at least one side of the plurality of sides includes an aperture configured to allow light external to the temperature-controlled enclosure to be detected by the image sensor, and wherein an interior surface of the at least one side including the aperture is configured to be at least partially separated from the sensing device by an air gap;

a heat sink structure at least partially enclosed by the exterior body; and a heat-conducting material in thermal contact with the heat sink structure, wherein the heat-conducting material is configured to be in thermal contact with at least a portion of the sensing device.

10. The temperature-controlled enclosure of claim 9, wherein the heat sink structure and the at least one side are configured to be at least partially separated by the sensing device.

11. The temperature-controlled enclosure of claim 9, further comprising a solar panel attached to the at least one side.

12. The temperature-controlled enclosure of claim 11, wherein the solar panel is configured to charge a power source of the sensing device.

13. The temperature-controlled enclosure of claim 11, wherein the solar panel is configured to charge a power source of a fan of the temperature-controlled enclosure.

14. The temperature-controlled enclosure of claim 9, wherein the heat sink structure is positioned within the temperature-controlled enclosure so as to preclude obscuring a predesignated location on a surface of the sensing device.

15. The temperature-controlled enclosure of claim 9, wherein the exterior body is further coupled to a joint, and wherein the joint is configured to allow one or more movements of the temperature-controlled enclosure in three-dimensional space.

16. The temperature-controlled enclosure of claim 15, wherein the joint is further coupled to an attachment surface configured to attach to at least one of a dashboard or a windshield of a vehicle.

17. The temperature-controlled enclosure of claim 9, further comprising:

a fan; and a power cord configured to supply electric current to the fan and the sensing device.

18. The temperature-controlled enclosure of claim 9, wherein the air gap is configured to act as a layer of thermal insulation for precluding transfer of an external source of heat to the sensing device.

19. A temperature-controlled enclosure capable of securing a portable device, the temperature-controlled enclosure, comprising:

an exterior body capable of dissipating heat from the portable device, wherein the exterior body is configured to enclose at least a portion of the portable device;

a heat sink structure at least partially enclosed by the exterior body, wherein the heat sink structure includes a first conducting material; and a second conducting material disposed between the heat sink structure and at least a portion of the portable device, wherein the second conducting material is configured to conduct heat from the portable device to the heat sink structure.

20. The temperature-controlled enclosure of claim 19, wherein the second conducting material is configured to be disposed between the first conducting material and the portable device.

* * * * *